UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., GESELLSCHAFT MIT BESCHRÄNKTER HAFTUNG, OF FRANKFORT-ON-THE-MAIN, GERMANY.

SUCCINIC-ACID ETHER OF CINCHONA ALKALOIDS.

SPECIFICATION forming part of Letters Patent No. 696,609, dated April 1, 1902.

Original application filed April 24, 1901, Serial No. 57,322. Divided and this application filed January 8, 1902. Serial No. 88,932. (No specimens.)

*To all whom it may concern:*

Be it known that I, HEINRICH THRON, a subject of the Emperor of Germany, and a resident of Frankfort-on-the-Main, Germany, have invented certain new and useful Improvements in Pharmaceutical Products, of which the following is a specification.

My invention relates to the production of hitherto unknown succinic-acid ethers of the cinchona alkaloids having in case quinin is used most probably the following formula:

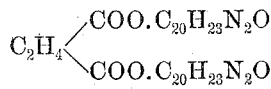

and the present application is a divisional application from my original application, Serial No. 57,322, filed April 24, 1901, designed to cover specifically the preparation of the succinic-acid ether of the cinchona alkaloids. According to my researches these new compounds can be easily obtained by heating the alphylethers of succinic acid with the cinchona alkaloids. On using, for instance, the phenolethers of succinic acid and quinin succinylquinin is obtained, which is tasteless and possesses great therapeutic value. The average dose employed for medicinal purposes is about two grams.

In carrying out my new process practically I can proceed as follows: 64.8 kilograms of anhydrous quinin are heated for several hours with twenty-seven kilograms or more of phenolether of succinic acid to a temperature of 130° to 140° centigrade. The new succinylquinin is then formed according to the following equation:

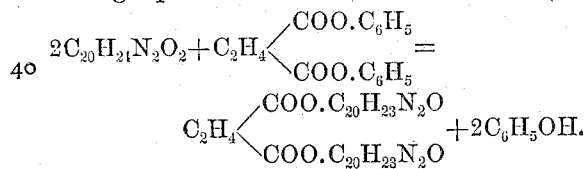

The product of the reaction is dissolved in benzene. The benzene solution is treated with dilute alkali, which removes the phenol, and the new succinylquinin is then extracted from the benzene solution by diluted acid. By adding dilute ammonia to the acid solution and shaking with ether the succinylquinin is dissolved in the latter. After evaporation of the ether the succinylquinin can be crystallized out of dilute alcohol.

The new succinylquinin forms large needles, melting at 97° centigrade. It is nearly tasteless, very difficultly soluble in water, readily soluble in alcohol, ether, benzene, and chloroform.

The new succinylquinin still retains basic properties and forms salts with organic and inorganic acids. These salts are also of great value in medicine, as the therapeutic effect of the succinylquinin may be modified and reinforced by the proper selection of the acid with which the ether is combined. Thus the salicylate of succinylquinin will be very efficient in rheumatic affections, whereas the cinnamic-acid salt of the succinylquinin will be of great value in tuberculous affections.

Instead of the phenolether of succinic acid other alphylethers of succinic acid may be employed in the above process, and instead of the quinin other cinchona alkaloids, such as quinidin, may be used.

Having now described my invention and in what manner the same is to be performed, what I claim as new, and desire to secure by Letters Patent, is—

1. The herein-described new succinic-acid ethers of the cinchona alkaloids being very difficultly soluble in water, readily soluble in alcohol, benzene, ether and chloroform, still possessing basic properties forming with organic and inorganic acids well-characterized salts, substantially as hereinbefore described.

2. The herein-described new succinic-acid ether of quinin having most probably the formula

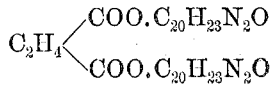

forming nearly-tasteless needles, melting at 97° centigrade very difficultly soluble in water, readily soluble in alcohol, benzene, ether and chloroform; forming well-characterized salts with organic and inorganic acids, substantially as described herein.

In testimony whereof I have signed my name in the presence of two subscribing witnesses.

HEINRICH THRON.

Witnesses:
　WILHELM EITEL,
　THEOPHIL REGELMANN.